(12) United States Patent
Nayak et al.

(10) Patent No.: US 12,501,428 B2
(45) Date of Patent: Dec. 16, 2025

(54) METHOD AND APPARATUS FOR TRAFFIC URGENCY INDICATION

(71) Applicant: Samsung Electronics Co., Ltd., Suwon-si (KR)

(72) Inventors: Peshal Nayak, Plano, TX (US); Boon Loong Ng, Plano, TX (US); Rubayet Shafin, Allen, TX (US); Vishnu Vardhan Ratnam, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 391 days.

(21) Appl. No.: 18/322,501

(22) Filed: May 23, 2023

(65) Prior Publication Data

US 2023/0389014 A1     Nov. 30, 2023

Related U.S. Application Data

(60) Provisional application No. 63/417,569, filed on Oct. 19, 2022, provisional application No. 63/398,423, filed on Aug. 16, 2022, provisional application No. 63/396,813, filed on Aug. 10, 2022, provisional application No. 63/346,055, filed on May 26, 2022.

(51) Int. Cl.
*H04W 72/1268* (2023.01)
*H04W 28/02* (2009.01)
*H04W 72/23* (2023.01)
*H04W 76/10* (2018.01)

(52) U.S. Cl.
CPC ... *H04W 72/1268* (2013.01); *H04W 28/0278* (2013.01); *H04W 72/23* (2023.01); *H04W 76/10* (2018.02)

(58) Field of Classification Search
CPC ......... H04W 72/1268; H04W 28/0278; H04W 72/23; H04W 76/10; H04W 28/0236; H04W 84/12; H04W 72/1221
See application file for complete search history.

(56) References Cited

U.S. PATENT DOCUMENTS

2007/0104162 A1   5/2007  Kneckt et al.
2017/0245296 A1*  8/2017  Huang ............... H04W 74/006
(Continued)

FOREIGN PATENT DOCUMENTS

EP    4145938 A1     3/2023
WO    2021202368 A1  10/2021
WO    2021228085 A1  11/2021

OTHER PUBLICATIONS

Extended European Search Report issued Jan. 27, 2025 regarding Application No. 23812187.5, 11 pages.
(Continued)

*Primary Examiner* — Kyaw Z Soe

(57) ABSTRACT

Methods and apparatuses for supporting traffic urgency indication. A method for wireless communication performed by a non-access point (AP) device that comprises a first station (STA), comprises forming a link with a first AP; transmitting information associated with a traffic transmission to the first AP, the information including a scheduling parameter configured to aid the first AP in making a scheduling decision; receiving data associated with the scheduling parameter from the first AP; and based on the received data, determining to transmit the traffic transmission to the first AP.

20 Claims, 12 Drawing Sheets

(56) References Cited

U.S. PATENT DOCUMENTS

2018/0103460 A1* 4/2018 Sharma ................. H04W 76/27
2020/0413285 A1   12/2020 Li et al.

OTHER PUBLICATIONS

IEEE P802.11be™/D1.6; Draft Standard for Information technology—Telecommunications and information exchange between systems Local and metropolitan area networks—Specific requirements; "Part 11: Wireless LAN Medium Access Control (MAC) and Physical Layer (PHY) Specifications—Amendment 8: Enhancements for extremely high throughput (EHT)," May 2022, 887 pages.
EEE P802.11-REVme™/D1.1; Draft Standard for Information Technology—Telecommunications and Information Exchange between Systems Local and Metropolitan Area Networks—Specific Requirements/D1.1; "Part 11: Wireless AN Medium Access Control (MAC) and Physical Layer (PHY) Specifications," Feb. 2022, 6097 pages.
International Search Report and Written Opinion issued Sep. 1, 2023 regarding International Application No. PCT/KR2023/007225, 8 pages.
Cavalcanti et al., "Capabilities to support Time-Aware Scheduling in 802.11be", IEEE 802.11-19/1933r1, Nov. 2019, 24 pages.
Li et al., "CC36 comment resolution: P2P Buffer report", IEEE 802.11-22/0763r0, May 2022, 7 pages.
Huang, "Proposed Draft Specification for MLD Transmit Buffer Control", IEEE 802.11-21/0192r0, Feb. 2021, 2 pages.
Chu, "CC36 comment resolution: Triggered TXOP Sharing", IEEE 802.11-21/1509r2, Feb. 2022, 8 pages.

* cited by examiner

| ACI Bitmap | Delta TID | ACI High | Scaling Factor | Queue Size High | Queue Size All | TID | Link ID | Packet Identifier | Duration/any metric mentioned herein for traffic urgency indication |
|---|---|---|---|---|---|---|---|---|---|
| 4 | 2 | 2 | 2 | 8 | 8 | 4 | 4 | 8 | 64 |

Size:

FIG. 11

METHOD AND APPARATUS FOR TRAFFIC URGENCY INDICATION

CROSS-REFERENCE TO RELATED APPLICATION AND CLAIM OF PRIORITY

This application claims priority under 35 U.S.C. § 119(e) to U.S. Provisional Patent Application No. 63/346,055 filed on May 26, 2022, U.S. Provisional Patent Application No. 63/396,813 filed on Aug. 10, 2022, U.S. Provisional Patent Application No. 63/398,423 filed on Aug. 16, 2022, and U.S. Provisional Patent Application No. 63/417,569 filed on Oct. 19, 2022, which is hereby incorporated by reference in its entirety.

TECHNICAL FIELD

This disclosure relates generally to transmission efficiency in wireless communications systems that include multi-link devices. Embodiments of this disclosure relate to methods and apparatuses for traffic urgency indication.

BACKGROUND

Wireless local area network (WLAN) technology allows devices to access the internet in the 2.4 GHz, 5 GHz, 6 GHz, or 60 GHz frequency bands. WLANs are based on the Institute of Electrical and Electronic Engineers (IEEE) 802.11 standards. The IEEE 802.11 family of standards aim to increase speed and reliability and to extend the operating range of wireless networks.

Multi-link operation (MLO) is a feature that is currently being developed by the standards body for next generation extremely high throughput (EHT) Wi-Fi systems in IEEE 802.11be. The Wi-Fi devices that support MLO are referred to as multi-link devices (MLD). With MLO, it is possible for a non-access point (AP) multi-link device (MLD) to discover, authenticate, associate, and set up multiple links with an AP MLD. Channel access and frame exchange is possible on each link between the AP MLD and non-AP MLD.

SUMMARY

Embodiments of the present disclosure provide methods and apparatuses for traffic urgency indication.

In one embodiment, a non-AP MLD is provided, comprising: a first station (STA) comprising: a transceiver configured to: form a link with a first AP, transmit information associated with a traffic transmission to the first AP, the information including a scheduling parameter configured to aid the first AP in making a scheduling decision, and receive data associated with the scheduling parameter from the first AP. The non-AP MLD includes a processor operably coupled to the first STA, the processor configured, based on the received data, to determine to transmit the traffic transmission to the first AP.

In another embodiment, a method for wireless communication performed by a non-access point (AP) device that comprises a first station (STA) is provided, the method comprising forming a link with a first AP; transmitting information associated with a traffic transmission to the first AP, the information including a scheduling parameter configured to aid the first AP in making a scheduling decision; receiving data associated with the scheduling parameter from the first AP; and based on the received data, determining to transmit the traffic transmission to the first AP.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. As used herein, such terms as "1st" and "2nd," or "first" and "second" may be used to simply distinguish a corresponding component from another and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 11 illustrates an example format of a control information sub-field of a buffer status report frame for traffic urgency indication according to embodiments of the present disclosure.

DETAILED DESCRIPTION

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: IEEE P802.11be/D1.6, 2022 (herein REF [1]); IEEE P802.11-REVme/D1.1, 2022 (herein REF [2]).

Embodiments of the present disclosure provide mechanisms for traffic urgency indication.

Figure 1:
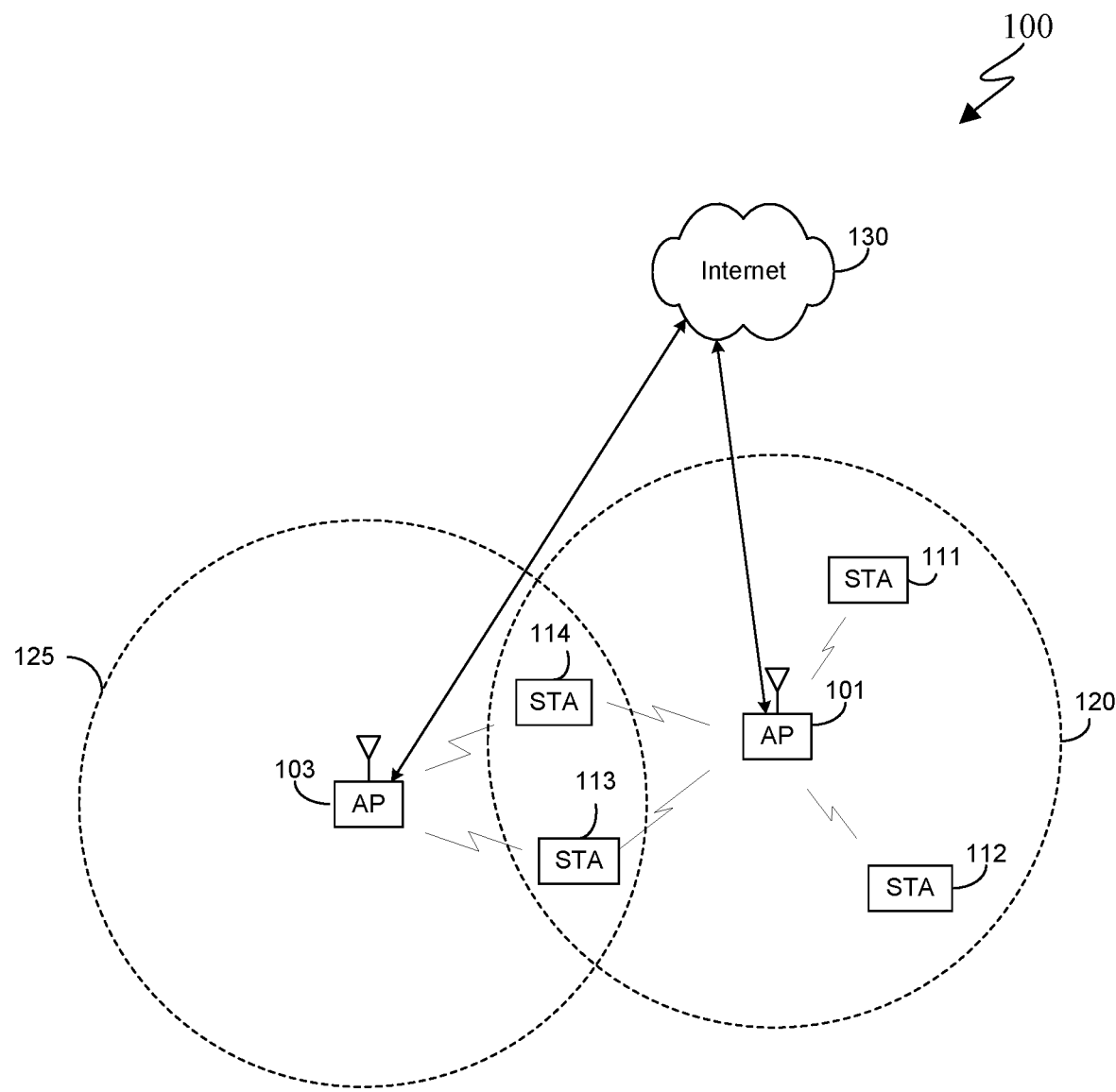
FIG. 1 illustrates an example wireless network according to embodiments of the present disclosure.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of this disclosure.

The wireless network 100 includes APs 101 and 103. The APs 101 and 103 communicate with at least one network 130, such as the Internet, a proprietary Internet Protocol (IP) network, or other data network. The AP 101 provides wireless access to the network 130 for a plurality of STAs 111-114 within a coverage area 120 of the AP 101. The APs 101-103 may communicate with each other and with the STAs 111-114 using Wi-Fi or other WLAN communication techniques.

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel, the AP may also be referred to as a STA (e.g., an AP STA). Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.). This type of STA may also be referred to as a non-AP STA.

In various embodiments of this disclosure, each of the APs 101 and 103 and each of the STAs 111-114 may be an MLD. In such embodiments, APs 101 and 103 may be AP MLDs, and STAs 111-114 may be non-AP MLDs. Each MLD is affiliated with more than one STA. For convenience of explanation, an AP MLD is described herein as affiliated with more than one AP (e.g., more than one AP STA), and a non-AP MLD is described herein as affiliated with more than one STA (e.g., more than one non-AP STA).

Dotted lines show the approximate extents of the coverage areas 120 and 125, which are shown as approximately circular for the purposes of illustration and explanation only. It should be clearly understood that the coverage areas associated with APs, such as the coverage areas 120 and 125, may have other shapes, including irregular shapes, depending upon the configuration of the APs and variations in the radio environment associated with natural and man-made obstructions.

As described in more detail below, one or more of the APs may include circuitry and/or programming for traffic urgency indication. Although FIG. 1 illustrates one example of a wireless network 100, various changes may be made to FIG. 1. For example, the wireless network 100 could include any number of APs and any number of STAs in any suitable arrangement. Also, the AP 101 could communicate directly with any number of STAs and provide those STAs with wireless broadband access to the network 130. Similarly, each AP 101-103 could communicate directly with the network 130 and provide STAs with direct wireless broadband access to the network 130. Further, the APs 101 and/or 103 could provide access to other or additional external networks, such as external telephone networks or other types of data networks.

Figure 2A:
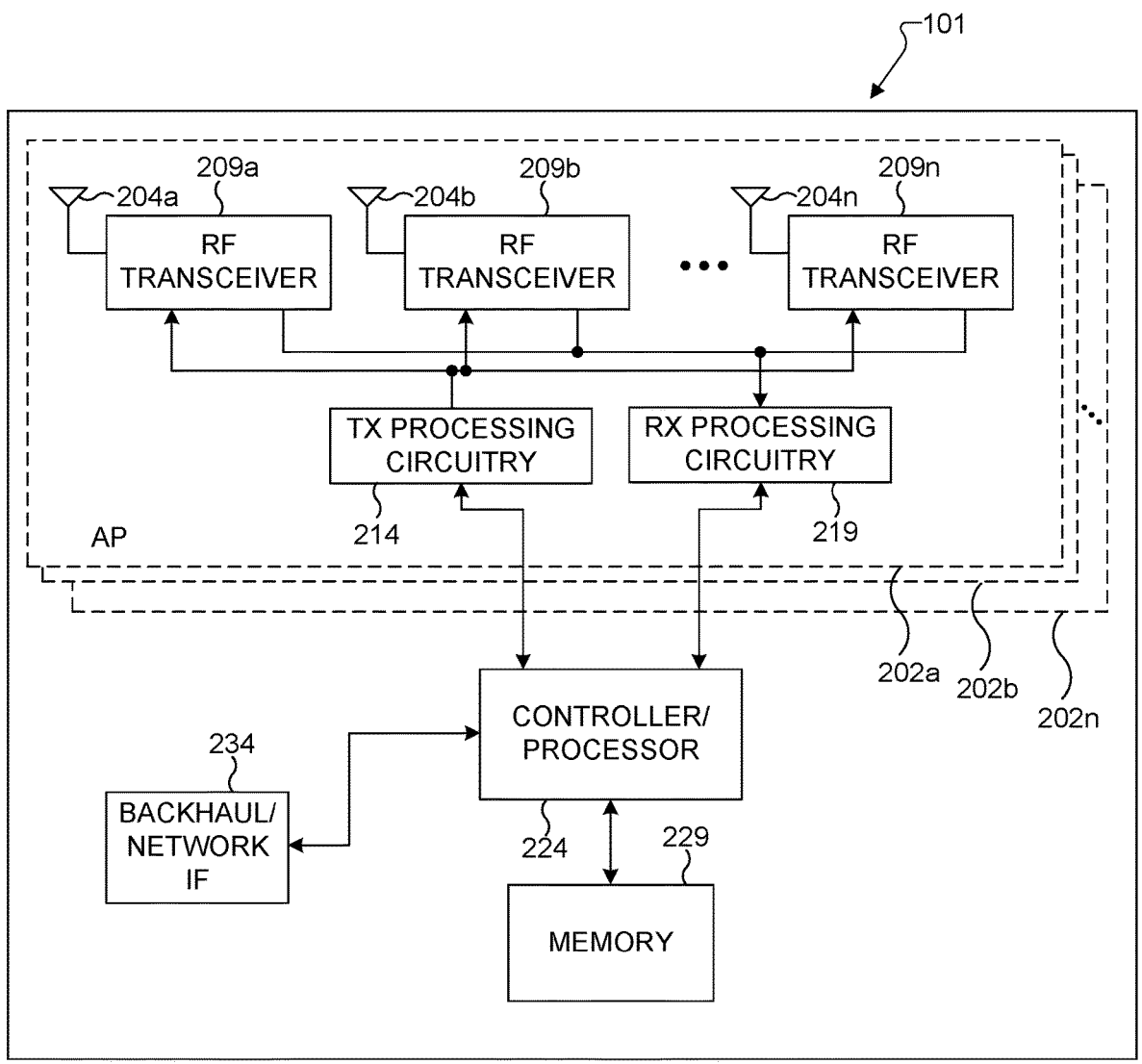
FIG. 2A illustrates an example AP according to embodiments of the present disclosure.

FIG. 2A illustrates an example AP 101 according to various embodiments of the present disclosure. The embodiment of the AP 101 illustrated in FIG. 2A is for illustration only, and the AP 103 of FIG. 1 could have the same or similar configuration. In the embodiments discussed herein below, the AP 101 is an AP MLD. However, APs come in a wide variety of configurations, and FIG. 2A does not limit the scope of this disclosure to any particular implementation of an AP.

The AP MLD 101 is affiliated with multiple APs 202a-202n (which may be referred to, for example, as AP1-APn). Each of the affiliated APs 202a-202n includes multiple antennas 204a-204n, multiple RF transceivers 209a-209n, transmit (TX) processing circuitry 214, and receive (RX) processing circuitry 219. The AP MLD 101 also includes a controller/processor 224, a memory 229, and a backhaul or network interface 234.

The illustrated components of each affiliated AP 202a-202n may represent a physical (PHY) layer and a lower media access control (LMAC) layer in the open systems interconnection (OSI) networking model. In such embodiments, the illustrated components of the AP MLD 101 represent a single upper MAC (UMAC) layer and other higher layers in the OSI model, which are shared by all of the affiliated APs 202a-202n.

For each affiliated AP 202a-202n, the RF transceivers 209a-209n receive, from the antennas 204a-204n, incoming RF signals, such as signals transmitted by STAs in the network 100. In some embodiments, each affiliated AP 202a-202n operates at a different bandwidth, e.g., 2.4 GHz, 5 GHz, or 6 GHz, and accordingly the incoming RF signals received by each affiliated AP may be at a different frequency of RF. The RF transceivers 209a-209n down-convert the incoming RF signals to generate IF or baseband signals. The IF or baseband signals are sent to the RX processing circuitry 219, which generates processed baseband signals by filtering, decoding, and/or digitizing the baseband or IF signals. The RX processing circuitry 219 transmits the processed baseband signals to the controller/processor 224 for further processing.

For each affiliated AP 202a-202n, the TX processing circuitry 214 receives analog or digital data (such as voice data, web data, e-mail, or interactive video game data) from the controller/processor 224. The TX processing circuitry 214 encodes, multiplexes, and/or digitizes the outgoing baseband data to generate processed baseband or IF signals. The RF transceivers 209a-209n receive the outgoing processed baseband or IF signals from the TX processing circuitry 214 and up-convert the baseband or IF signals to RF signals that are transmitted via the antennas 204a-204n. In embodiments wherein each affiliated AP 202a-202n operates at a different bandwidth, e.g., 2.4 GHz, 5 GHz, or 6 GHz, the outgoing RF signals transmitted by each affiliated AP may be at a different frequency of RF.

The controller/processor 224 can include one or more processors or other processing devices that control the overall operation of the AP MLD 101. For example, the controller/processor 224 could control the reception of forward channel signals and the transmission of reverse channel signals by the RF transceivers 209a-209n, the RX processing circuitry 219, and the TX processing circuitry 214 in accordance with well-known principles. The controller/processor 224 could support additional functions as well, such as more advanced wireless communication functions. For instance, the controller/processor 224 could support beam forming or directional routing operations in which outgoing signals from multiple antennas 204a-204n are weighted differently to effectively steer the outgoing signals in a desired direction. The controller/processor 224 could also support OFDMA operations in which outgoing signals are assigned to different subsets of subcarriers for different recipients (e.g., different STAs 111-114). Any of a wide variety of other functions could be supported in the AP MLD 101 by the controller/processor 224 including traffic urgency indication. In some embodiments, the controller/processor 224 includes at least one microprocessor or microcontroller. The controller/processor 224 is also capable of executing programs and other processes resident in the memory 229, such as an OS. The controller/processor 224 can move data into or out of the memory 229 as required by an executing process.

The controller/processor 224 is also coupled to the backhaul or network interface 234. The backhaul or network interface 234 allows the AP MLD 101 to communicate with other devices or systems over a backhaul connection or over a network. The interface 234 could support communications over any suitable wired or wireless connection(s). For example, the interface 234 could allow the AP MLD 101 to communicate over a wired or wireless local area network or over a wired or wireless connection to a larger network (such as the Internet). The interface 234 includes any suitable structure supporting communications over a wired or wireless connection, such as an Ethernet or RF transceiver. The memory 229 is coupled to the controller/processor 224. Part of the memory 229 could include a RAM, and another part of the memory 229 could include a Flash memory or other ROM.

As described in more detail below, the AP MLD 101 may include circuitry and/or programming for traffic urgency indication. Although FIG. 2A illustrates one example of AP MLD 101, various changes may be made to FIG. 2A. For example, the AP MLD 101 could include any number of each component shown in FIG. 2A. As a particular example, an AP MLD 101 could include a number of interfaces 234, and the controller/processor 224 could support routing functions to route data between different network addresses. As another particular example, while each affiliated AP 202a-202n is shown as including a single instance of TX processing circuitry 214 and a single instance of RX processing circuitry 219, the AP MLD 101 could include multiple instances of each (such as one per RF transceiver) in one or more of the affiliated APs 202a-202n. Alternatively, only one antenna and RF transceiver path may be included in one or more of the affiliated APs 202a-202n, such as in legacy APs. Also, various components in FIG. 2A could be combined, further subdivided, or omitted and additional components could be added according to particular needs.

Figure 2B:
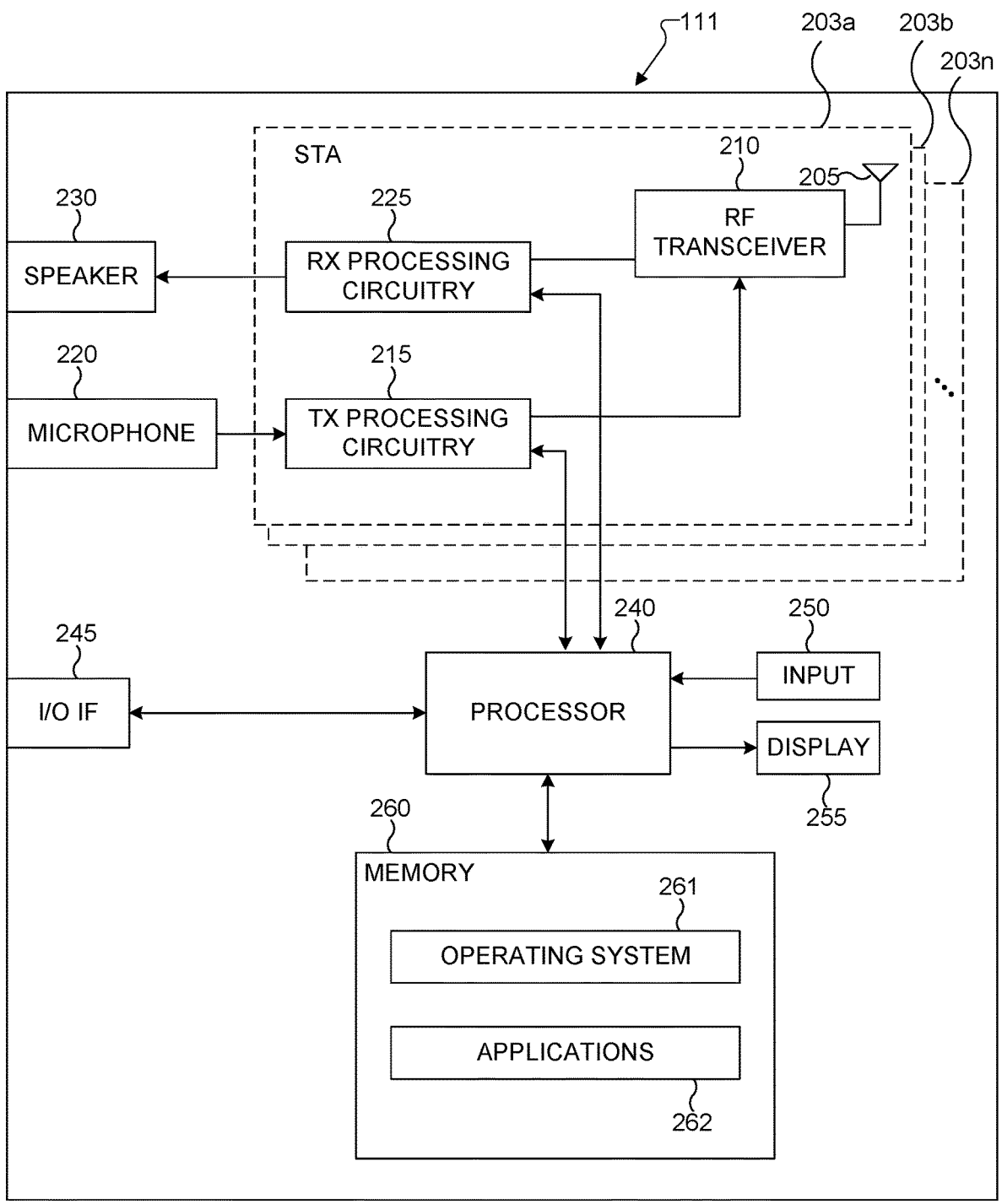
FIG. 2B illustrates an example station (STA) according to embodiments of the present disclosure.

FIG. 2B illustrates an example STA 111 according to various embodiments of this disclosure. The embodiment of the STA 111 illustrated in FIG. 2B is for illustration only, and the STAs 111-115 of FIG. 1 could have the same or similar configuration. In the embodiments discussed herein below, the STA 111 is a non-AP MLD. However, STAs come in a wide variety of configurations, and FIG. 2B does not limit the scope of this disclosure to any particular implementation of a STA.

The non-AP MLD 111 is affiliated with multiple STAs 203a-203n (which may be referred to, for example, as STA1-STAn). Each of the affiliated STAs 203a-203n includes antenna(s) 205, a radio frequency (RF) transceiver 210, TX processing circuitry 215, and receive (RX) processing circuitry 225. The non-AP MLD 111 also includes a microphone 220, a speaker 230, a controller/processor 240, an input/output (I/O) interface (IF) 245, a touchscreen 250, a display 255, and a memory 260. The memory 260 includes an operating system (OS) 261 and one or more applications 262.

The illustrated components of each affiliated STA 203a-203n may represent a PHY layer and an LMAC layer in the OSI networking model. In such embodiments, the illustrated components of the non-AP MLD 111 represent a single UMAC layer and other higher layers in the OSI model, which are shared by all of the affiliated STAs 203a-203n.

For each affiliated STA 203a-203n, the RF transceiver 210 receives, from the antenna(s) 205, an incoming RF signal transmitted by an AP of the network 100. In some embodiments, each affiliated STA 203a-203n operates at a different bandwidth, e.g., 2.4 GHz, 5 GHz, or 6 GHz, and accordingly the incoming RF signals received by each affiliated STA may be at a different frequency of RF. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the controller/processor 240 for further processing (such as for web browsing data).

For each affiliated STA 203a-203n, the TX processing circuitry 215 receives analog or digital voice data from the microphone 220 or other outgoing baseband data (such as web data, e-mail, or interactive video game data) from the controller/processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna(s) 205. In embodiments wherein each affiliated STA 203a-203n operates at a different bandwidth, e.g., 2.4 GHz, 5 GHz, or 6 GHz, the outgoing RF signals transmitted by each affiliated STA may be at a different frequency of RF.

The controller/processor 240 can include one or more processors and execute the basic OS program 261 stored in the memory 260 in order to control the overall operation of the non-AP MLD 111. In one such operation, the main controller/processor 240 controls the reception of forward channel signals and the transmission of reverse channel signals by the RF transceiver 210, the RX processing circuitry 225, and the TX processing circuitry 215 in accordance with well-known principles. The main controller/processor 240 can also include processing circuitry configured to support traffic urgency indication. In some embodiments, the controller/processor 240 includes at least one microprocessor or microcontroller.

The controller/processor 240 is also capable of executing other processes and programs resident in the memory 260, such as operations for supporting traffic urgency indication. The controller/processor 240 can move data into or out of the memory 260 as required by an executing process. In some embodiments, the controller/processor 240 is configured to execute a plurality of applications 262, such as applications for supporting traffic urgency indication. The controller/processor 240 can operate the plurality of applications 262 based on the OS program 261 or in response to a signal received from an AP. The main controller/processor 240 is also coupled to the I/O interface 245, which provides non-AP MLD 111 with the ability to connect to other devices such as laptop computers and handheld computers. The I/O interface 245 is the communication path between these accessories and the main controller 240.

The controller/processor 240 is also coupled to the touchscreen 250 and the display 255. The operator of the non-AP MLD 111 can use the touchscreen 250 to enter data into the non-AP MLD 111. The display 255 may be a liquid crystal display, light emitting diode display, or other display capable of rendering text and/or at least limited graphics, such as from web sites. The memory 260 is coupled to the controller/processor 240. Part of the memory 260 could include a random-access memory (RAM), and another part of the memory 260 could include a Flash memory or other read-only memory (ROM).

Although FIG. 2B illustrates one example of non-AP MLD 111, various changes may be made to FIG. 2B. For example, various components in FIG. 2B could be combined, further subdivided, or omitted and additional components could be added according to particular needs. In particular examples, one or more of the affiliated STAs 203a-203n may include any number of antenna(s) 205 for MIMO communication with an AP 101. In another example, the non-AP MLD 111 may not include voice communication or the controller/processor 240 could be divided into multiple processors, such as one or more central processing units (CPUs) and one or more graphics processing units (GPUs). Also, while FIG. 2B illustrates the non-AP MLD 111 configured as a mobile telephone or smartphone, non-AP MLDs can be configured to operate as other types of mobile or stationary devices.

Various embodiments of the present disclosure recognize that the measurement request and response element framework specified in REF [2] provides a framework for the AP to request an STA to undertake a specified measurement action and send the measurement report to the AP. A number of request and response elements have been defined in REF [2] to convey various information such as clear channel assessment (CCA), receive power indication (RPI), etc. Further, the AP can also use the framework to request the destination STA to activate an autonomous reporting mode. This mode allows the STA to transmit measurement results for which an explicit measurement request has not been made. The format for a Measurement request frame is as shown in FIG. 3.

Figure 3:
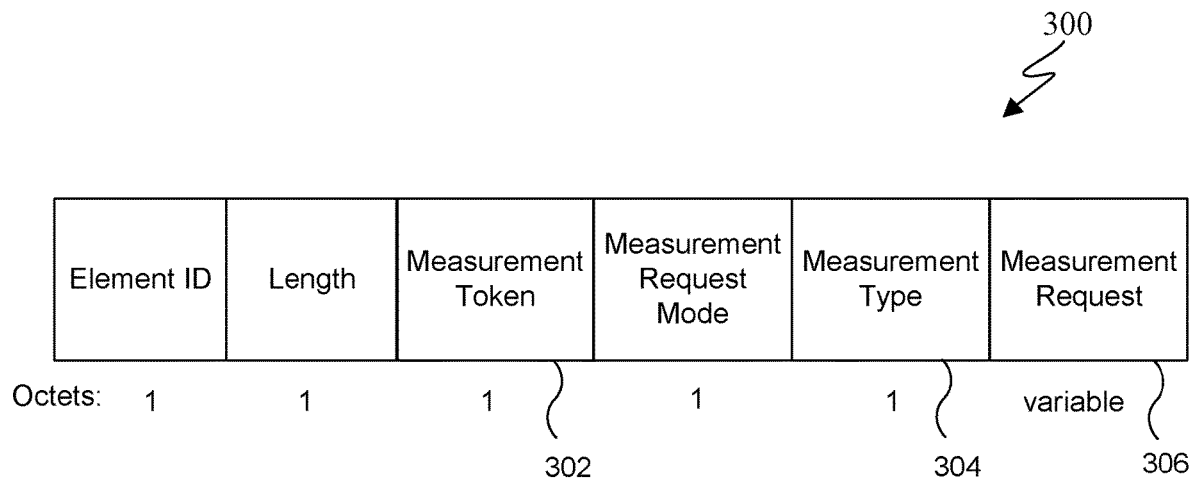
FIG. 3 illustrates an example measurement request frame format according to embodiments of the present disclosure.

FIG. 3 illustrates an example measurement request frame format 300 according to embodiments of the present disclosure. The embodiment of the example measurement request frame format 300 shown in FIG. 3 is for illustration only. Other embodiments of the example measurement request frame format 300 could be used without departing from the scope of this disclosure.

As illustrated in FIG. 3, the measurement request frame contains a measurement token 302 which is a nonzero number that uniquely identifies the measurement request. Further, the measurement request frame contains a measurement request mode which contains a three-bit encoding to specify the nature of the response expected from the STA (e.g., the STA can send an autonomous measurement report to the AP). The measurement type 304 is a unique number that identifies the measurement that the AP requests from the STA. Currently, 18 types of measurement request types have been defined and the remaining values are reserved for future request definitions. Finally, the measurement request field 306 (the last field in the frame shown in FIG. 3) carries a measurement request element specifying details of the measurement that the AP requests from the STA.

Figure 4:
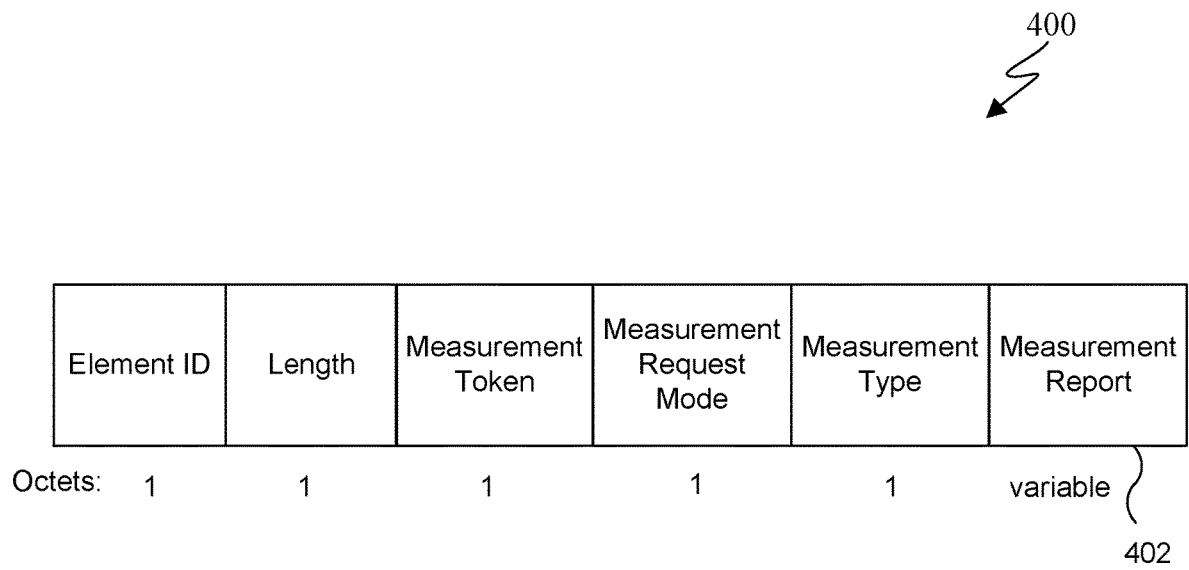
FIG. 4 illustrates an example measurement response frame format according to embodiments of the present disclosure.

FIG. 4 illustrates an example measurement response frame format 400 according to embodiments of the present disclosure. The embodiment of the example measurement response frame format 400 shown in FIG. 4 is for illustration only. Other embodiments of the example measurement response frame format 400 could be used without departing from the scope of this disclosure.

As illustrated in FIG. 4, the measurement response frame is similar to the measurement request frame. The key difference is the measurement response frame contains a measurement report field 402 (the last field in the frame shown in FIG. 4) which contains the report information (instead of a measurement request field as in the measurement request frame).

Figure 5:
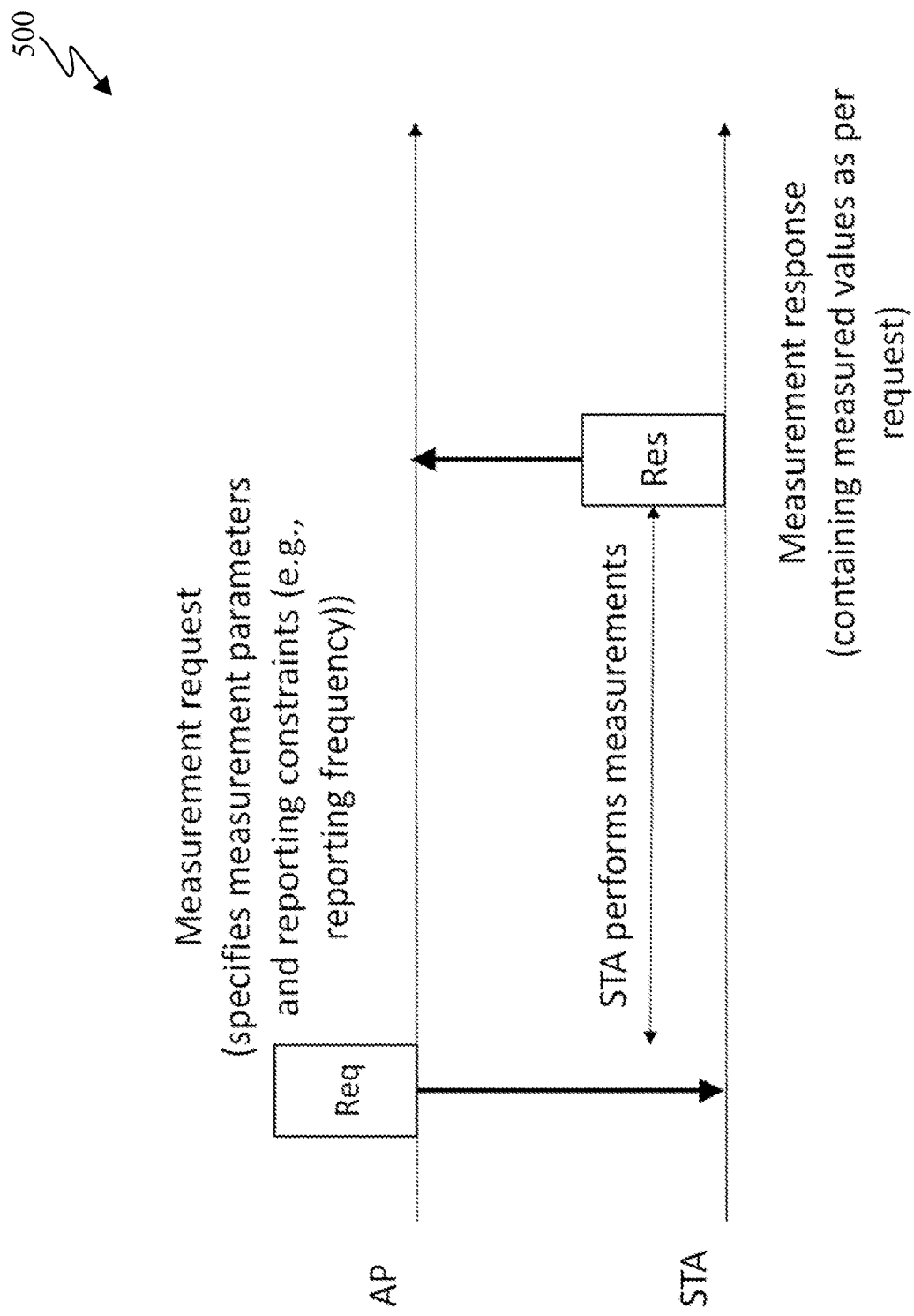
FIG. 5 illustrates an example timeline of measurement request and response framework operation according to embodiments of the present disclosure.

FIG. 5 illustrates an example timeline of measurement request and response framework operation 500 according to embodiments of the present disclosure. The embodiment of the example timeline of measurement request and response framework operation 500 shown in FIG. 5 is for illustration only. Other embodiments of the example timeline of measurement request and response framework operation 500 could be used without departing from the scope of this disclosure.

As illustrated in FIG. 5, the AP requests the STA to perform a measurement action and send the measurement report to the AP. The measurement request specifies measurement parameters and reporting constraints, such as reporting frequency. The STA performs the measurements, and sends a measurement response that contains measured values as per the measurement request.

Various embodiments of the present disclosure recognize that triggered sharing is one of the newly introduced procedures in IEEE 802.11be REF [1]. According to the 802.11be specification, this procedure allows an AP to allocate a part of the time within an acquired TXOP duration to one of its associated non-AP extremely high-throughput (EHT) STA. This allocated duration can then be used by the associated non-AP EHT STA for transmission of one or more non-TB PPDUs.

Figure 6:
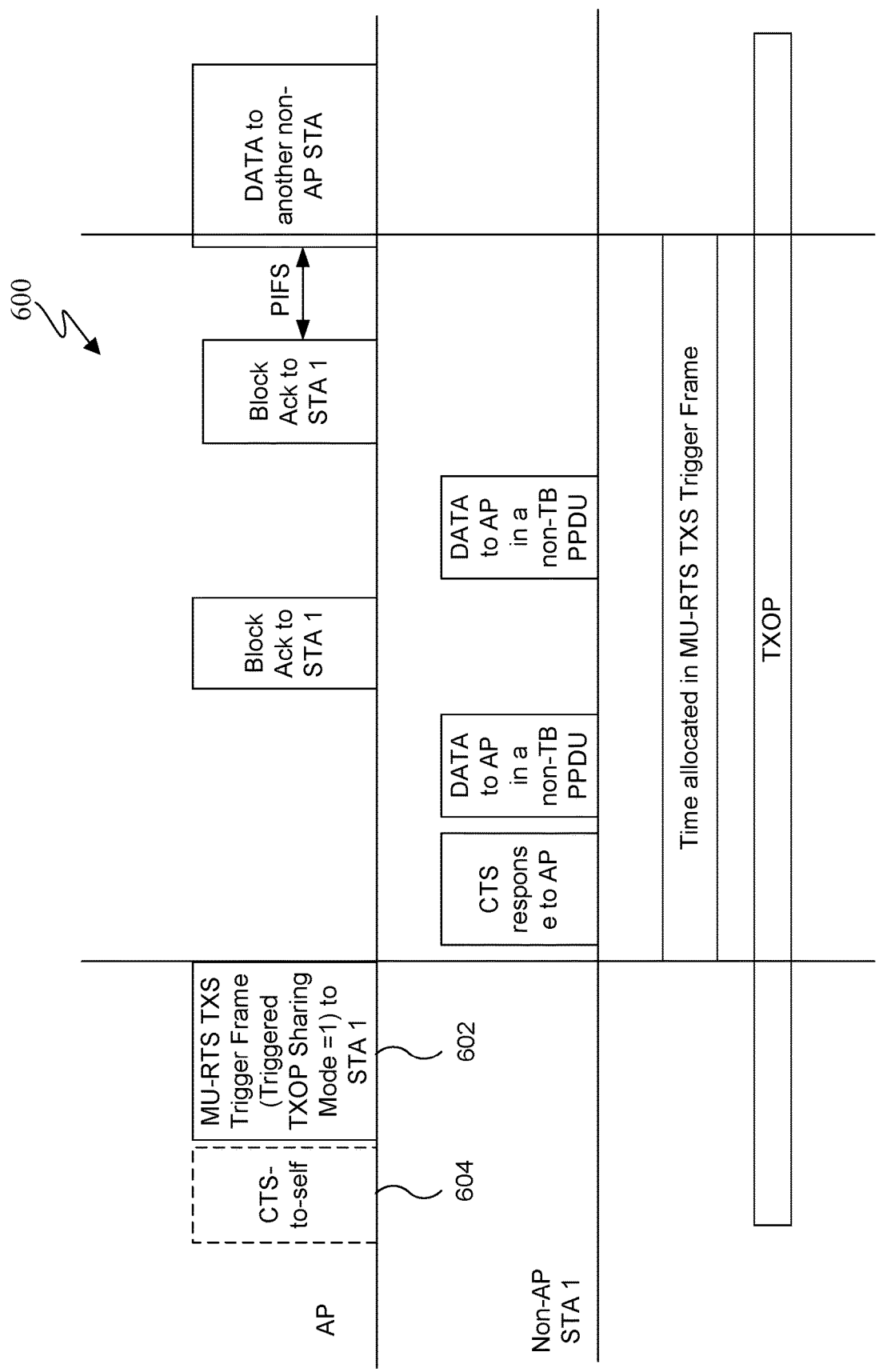
FIG. 6 illustrates an example timeline of a triggered TXOP sharing operation according to embodiments of the present disclosure.

FIG. 6 illustrates an example timeline 600 of a triggered TXOP sharing operation according to embodiments of the present disclosure. The embodiment of the example timeline 600 of a triggered TXOP sharing operation shown in FIG. 6 is for illustration only. Other embodiments of the example timeline 600 of a triggered TXOP sharing operation could be used without departing from the scope of this disclosure.

According to the 802.11be specification, an EHT AP can allocate a portion of its obtained TXOP duration to the non-AP EHT STA by transmitting a multi-user ready-to-send (MU-RTS) TXOP Sharing (TXS) Trigger Frame 602 containing a user info field addressed to the associated non-AP EHT STA. When the non-AP EHT STA receives a MU-RTS TXS Trigger Frame from its associated AP addressed to it, the non-AP EHT STA may transmit one or more non-TB PPDUs in the allocated time.

An example of triggered TXOP sharing mode operation is as shown in FIG. 6. When the AP obtains the TXOP after winning channel contention, the AP transmits a CTS-to-self 604. This is followed by a MU-RTS TXS Trigger frame which is transmitted to the target STA that the AP wants to share the TXOP duration with. The portion of the TXOP that is shared with the target non-AP STA (non-AP STA1 in the above example) is specified in the MU-RTS TXS Trigger frame itself. This duration is then used by the target STA to transmit its own frames on the uplink to the AP (mode 1) or to its peer STA (mode 2).

Various embodiments of the present disclosure recognize that an AP can have many STAs associated with it. Further, the uplink traffic may vary from STA to STA depending on the application run by the user on the STA. Further, when the AP obtains a TXOP, it may have its own data to transmit. As a result, the amount of time left within an obtained TXOP may not be sufficient to probe each STA that is associated with the AP.

Depending on the nature of the traffic, a non-AP MLD may have an urgent need to transmit traffic on one of its links. An example scenario is as follows. One of the STAs affiliated with the non-AP MLD could have a packet corresponding to real time/cloud gaming traffic in its queue and the delay requirement may be exceeded if the STA is not served within a certain amount of time. It might be beneficial if such STAs could be identified and served with higher priority.

Knowledge of which STA has such an urgent traffic transmission requirement could enable the AP to prioritize such STAs during TXOP sharing. Unfortunately, in the current specification, the AP does not have this information available.

Accordingly, various embodiments of the present disclosure provide procedures to enable an STA to indicate urgency in traffic transmission to its AP. Traffic urgency indication procedures discussed in the present disclosure can be used for a range of features/applications including but not limited to triggered TXOP sharing, R-TWT, AP side scheduling, etc. In the present disclosure, the embodiments are discussed in the context of triggered TXOP sharing. However, the procedures for traffic urgency indication can be used for any of the features/applications mentioned above.

According to one embodiment, the STA can indicate the urgency of traffic transmission in terms of a duration for which the corresponding packet(s) will be kept in the STA queue (e.g., a packet's expiration time which can be the duration from current time until the time when the delay bound of the packet is exceeded or the time at which the delay bound of the packet will be exceeded). In another embodiment, this can also be indicated in terms of packet enqueue time. The packet enqueue time can be the time at which the packet arrives in the MAC queue of the STA (e.g., it is generated by an application running on the STA and then pushed into the MAC queue). Further, this information can also be indicated for a head-of-line (HOL) packet and can be referred to as HOL packet delay feedback. The HOL packet delay information can be the enqueue time for the packet at the head of the queue. In the HOL packet delay information, instead of indicating enqueue time/packet expiration time for each packet, it can be indicated only for the first packet in the queue. The first packet is transmitted before every packet and so urgency will be highest for this packet as it has been in the queue for the longest period of time. Alternatively, it can be the duration for which the packet can be kept in the STA queue (e.g., a packet's expiration time). Further, this delay can be indicated at the MLD level or at the link level. According to one embodiment, a traffic identifier (e.g., TID) can be used to provide an indication of traffic urgency. According to this embodiment, a TID that corresponds to latency sensitive traffic (e.g., traffic with lower delay bounds) can be used to infer an urgency of transmission. According to another embodiment, the traffic type (e.g., traffic corresponding to emergency preparedness communication service (EPCS)) can be used for traffic urgency indication.

Figure 7:
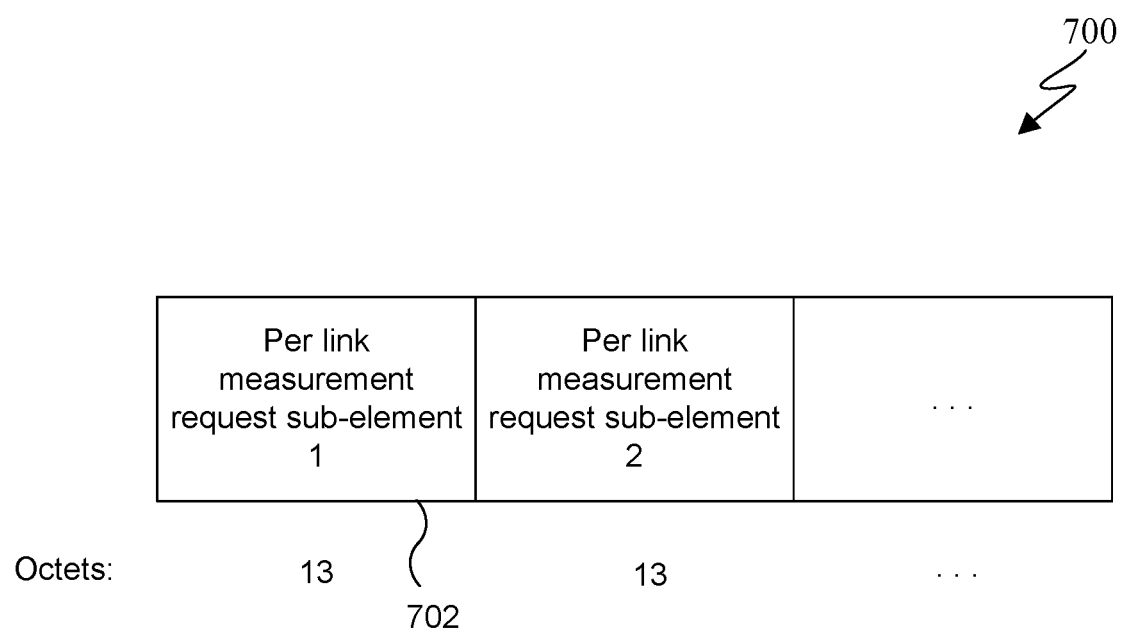
FIG. 7 illustrates an example measurement request field format used by the AP in the measurement request frame format according to embodiments of the present disclosure.

FIG. 7 illustrates an example measurement request field format 700 used by the AP in the measurement request frame format according to embodiments of the present disclosure. The embodiment of the example measurement request field format 700 used by the AP in the measurement request frame format shown in FIG. 7 is for illustration only. Other embodiments of the example measurement request field format 700 used by the AP in the measurement request frame format could be used without departing from the scope of this disclosure.

According to one embodiment, a new request and response element can be defined to operate within the measurement request and response framework. Further, according to this embodiment, the measurement request frame (e.g., as shown in FIG. 3) can be transmitted by the AP to the STA with the measurement request mode set to allow the STA to transmit an autonomous measurement report to the AP. This can authorize the STA to send an autonomous measurement report when needed to convey its traffic transmission urgency to the AP whenever needed without requiring the AP to transmit any additional requests/probing frames to the STA.

As described herein, the measurement request field (the last field in the frame shown in FIG. 3) carries the measurement request element specifying details of the measurement that the AP requests from the STA. Therefore, according to one embodiment, the measurement request field can contain one or more per link measurement request sub-elements 702 each of which can define the measurement request for a given link. An example is as shown in FIG. 7.

Each per link measurement request sub-element can contain one or more of the information items shown in Table 1:

TABLE 1

Information content of the measurement request field to be carried in the measurement request frame

| Information Item name | Size (in octets) | Description |
| --- | --- | --- |
| Link ID | 1 | The link ID corresponding to the link for which the measurement request has been defined. The first four bits of the field can be used to indicate the link ID with the remaining bits kept reserved. |
| TID bitmap | 2 | The TID bitmap containing the TIDs corresponding to which the AP authorizes the STA to transmit a measurement response indicating a traffic urgency to the AP. |
| Measurement start time | 8 | The start time indicating from when the request can be considered as active. In one embodiment, the start time can be a multiple of a fixed pre-negotiated or pre-known value (e.g., TBTT, TU). According to another embodiment, the start time can be set to the TSF timer at the time at which the requested measurement starts with a value of 0 to indicate that it may start immediately. |
| Request active duration | 2 | The duration for which the request can be considered as active expressed in units of a fixed pre-negotiated or pre-known value (e.g., TBTT, TU). |

In response to receiving the measurement request frame from the AP, the STA can transmit a measurement response frame that includes an indication of the urgency of its traffic transmission. According to one embodiment, the STA can indicate the urgency of traffic transmission in terms of a duration for which the corresponding packet(s) will be kept in the STA queue. In another embodiment, this can also be indicated in terms of packet enqueue time. Further, this information can also be called as packet delay feedback and can be indicated for head of the link packets.

In one embodiment, this can be indicated in terms of a pre-negotiated or pre-known value (e.g., TBTT which stands for Target Beacon Transmission Time, TU which stands for time unit). In another embodiment, the duration can be indicated in terms of the TSF (timing synchronization function) timer value at the time at which the delay tolerance of the indicated TID packet will be exceeded. Further, according to this embodiment, the measurement report field in the measurement response frame can contain one or more of the information elements as shown in Table 2.

TABLE 2

Information content of the measurement report field to be carried in the measurement response frame (frame can carry one or more of the information indicated in this table)

| Information Item name | Size (bits) | Description |
| --- | --- | --- |
| Link ID | 4 | The link ID for which the information is being indicated. |
| TID | 4 | The TID for which this information is being indicated. The AP can also understand the priority of the buffered traffic based on its TID. |
| Packet identifier | 8 | A packet identifier (e.g., sequence number). When the AP receives a packet whose packet identifier matches this value, the AP can consider that the STA has transmitted the corresponding traffic and does not have any urgency unless another measurement response frame is received from the STA. Note that the STA may not need to transmit only one packet but may want to transmit multiple packets. In such a case, the packet identifier will correspond to the final packet that the STA has to send. |
| Duration | 64 | The duration until which the packet will be retained in the STA's queue/the duration until which the packet's delay tolerance is not exceeded. In one embodiment, this can be indicated in terms of a pre-negotiated or pre-known value (e.g., TBTT, TU). In another embodiment, the duration can be indicated in terms of the TSF timer value at the time at which the delay tolerance of the indicated TID packet will be exceeded. According to one embodiment, the delay tolerance can be the value that is indicated in a QoS characteristic element. In another embodiment, the TSF time indicated can be indicated in reference to the TSF time of the transmitting link. Alternatively, this can also be any of the metrics mentioned herein previously for indicating urgency of traffic transmission. |

Figure 8:
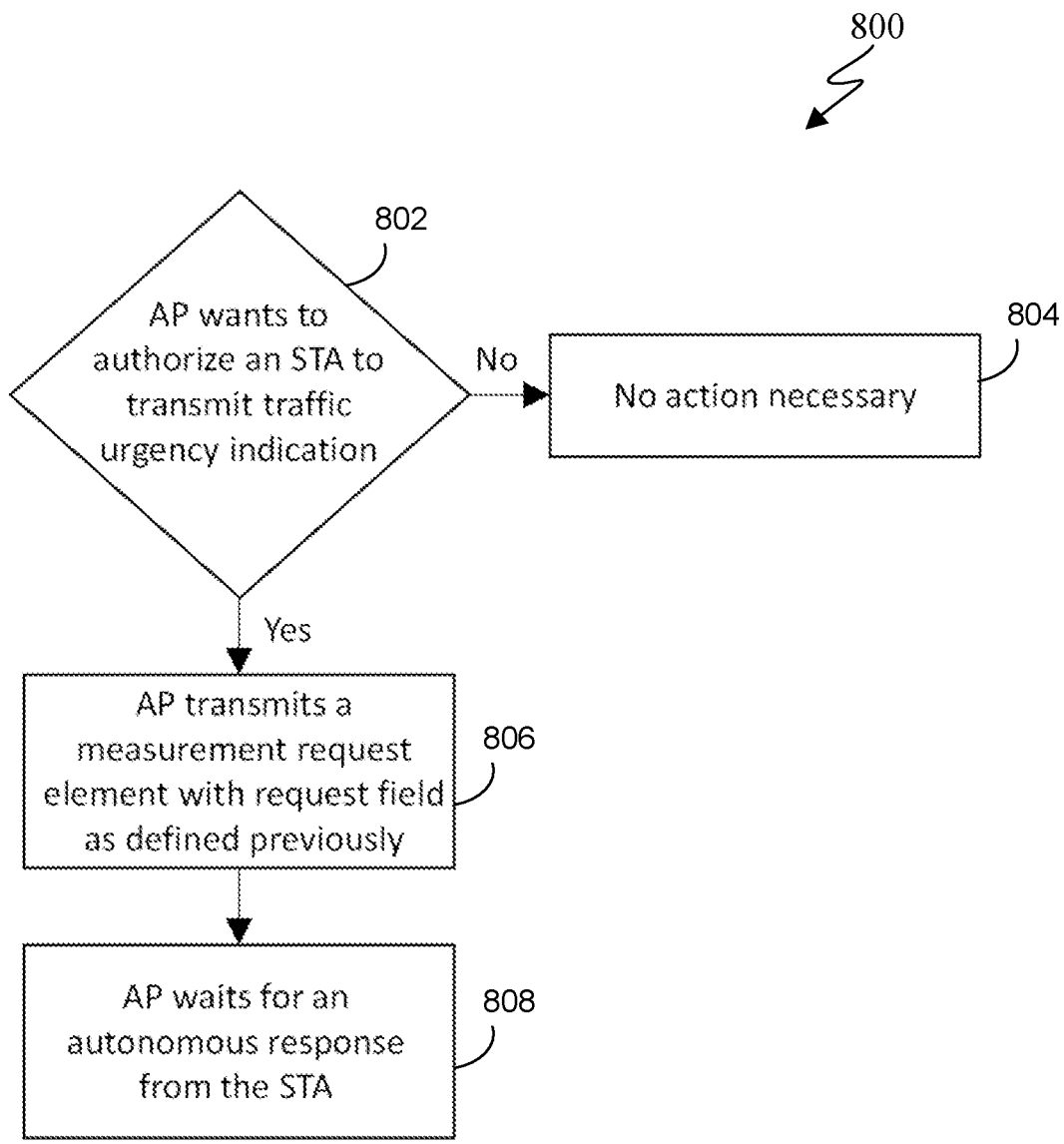
FIG. 8 illustrates a flowchart of a method performed by an AP for transmission of a measurement request frame according to embodiments of the present disclosure.

FIG. 8 illustrates a flowchart of a method 800 performed by an AP for transmission of a measurement request frame according to embodiments of the present disclosure. The embodiment of the method 800 performed by an AP for transmission of a measurement request frame shown in FIG. 8 is for illustration only. Other embodiments of the method 800 performed by an AP for transmission of a measurement request frame could be used without departing from the scope of this disclosure.

As illustrated in FIG. 8, in one embodiment, an AP MLD can authorize a non-AP MLD to indicate traffic transmission urgency for any of its affiliated STA. The method 800 begins at step 802, where a determination is made whether an AP wants to authorize an STA to transmit traffic urgency indication. If not, then at step 804, no action is necessary. If yes, then at step 806, the AP transmits a measurement request frame on any of the links that the corresponding non-AP MLD has formed with the AP MLD. At step 808, upon receiving the request frame from the AP MLD, the STAs on the indicated links can be considered as authorized to send such information, and the AP waits for a response from the STA.

Figure 9:
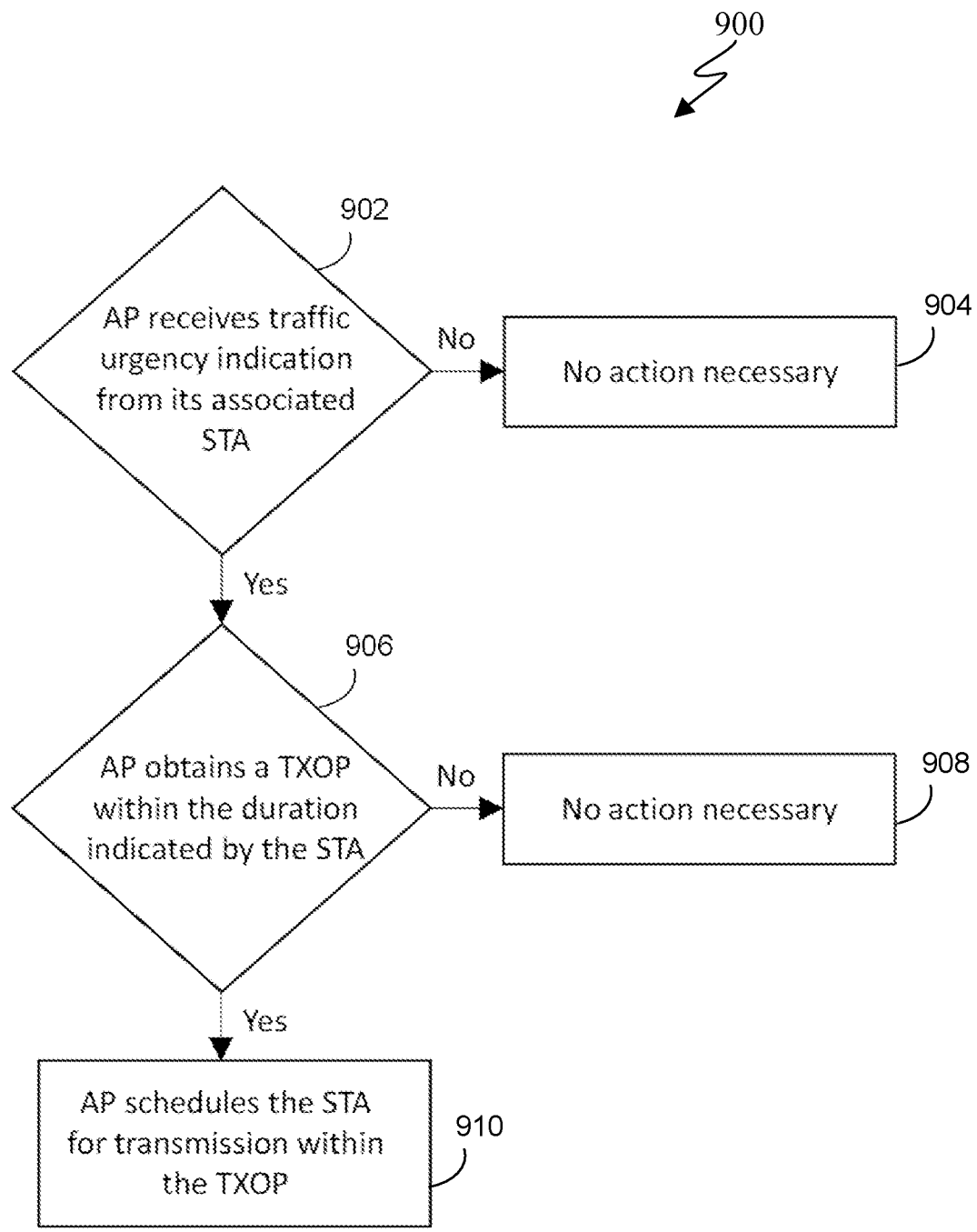
FIG. 9 illustrates a flowchart of a method performed by an AP for responding to a measurement response frame from a STA according to embodiments of the present disclosure.

FIG. 9 illustrates a flowchart of a method 900 performed by an AP for transmission of a measurement response frame from the STA according to embodiments of the present disclosure. The embodiment of the method 900 performed by an AP for transmission of a measurement response frame from the STA shown in FIG. 9 is for illustration only. Other embodiments of the method 900 performed by an AP for transmission of a measurement response frame from the STA could be used without departing from the scope of this disclosure.

As illustrated in FIG. 9, in one embodiment, when the AP receives a measurement response frame from the STA, the AP can share a duration of time within a TXOP that it has obtained prior to the duration value indicated in the response frame. The link on which the TXOP sharing is performed can be the link identified by the link ID in the measurement response frame. The method 900 begins at step 902, where a determination is made whether an AP receives a traffic urgency indication from its associated STA. If not, then at step 904, no action is necessary. If yes, then at step 906, a determination is made whether the AP obtains a TXOP within the duration indicated by the STA on the link indicated by the STA. If not, then at step 908, no action is necessary. If yes, then at step 910, the AP schedules the STA for transmission within the TXOP.

Figure 10:
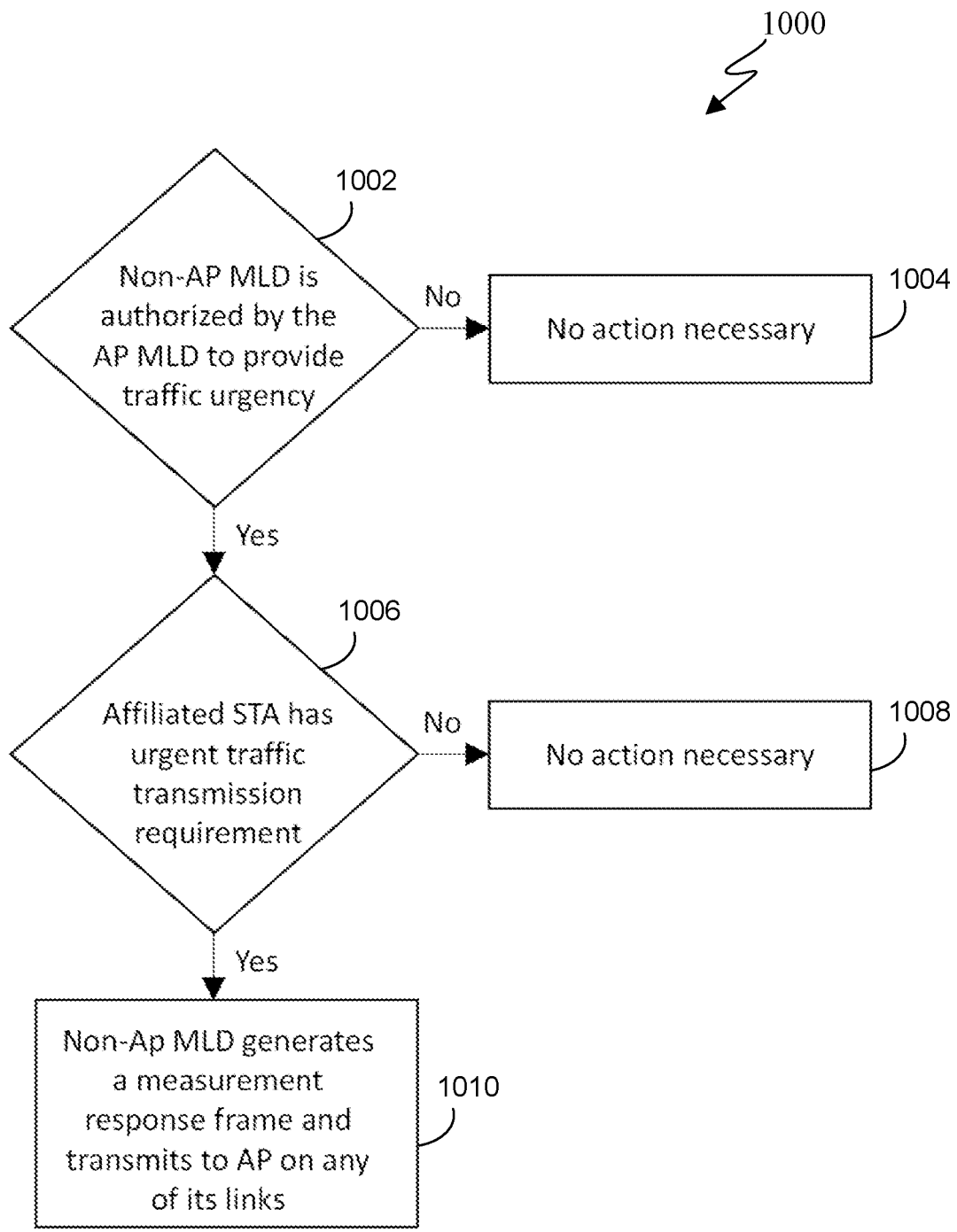
FIG. 10 illustrates a flowchart of a method performed by a STA for transmission of a measurement response frame according to embodiments of the present disclosure.

FIG. 10 illustrates a flowchart of a method 1000 performed by an STA for transmission of a measurement response frame according to embodiments of the present disclosure. The embodiment of the method 1000 performed by an STA for transmission of a measurement response frame shown in FIG. 10 is for illustration only. Other embodiments of the method 1000 performed by an STA for transmission of a measurement response frame could be used without departing from the scope of this disclosure.

As illustrated in FIG. 10, in one embodiment, after providing the indication, when the AP shares part of its acquired TXOP with the STA, the STA can transmit the packets corresponding to which the information was indicated in the measurement response frame. The method 1000 begins at step 1002, where a determination is made whether a non-AP MLD is authorized by the AP MLD to provide a traffic urgency indication. If not, then at step 1004, no action is necessary. If yes, then at step 1006, a determination is made whether an affiliated STA has an urgent traffic transmission requirement. If not, then at step 1008, no action is necessary. If yes, then at step 1010, the non-AP MLD generates a measurement response frame and transmits to the AP on any of the links.

In another embodiment, the STA can transmit an urgent traffic indication in a frame (e.g., any existing frame or in a newly defined frame sent separately) frame to the AP. This frame can contain information mentioned in Table 3. In one embodiment, one or more of the information fields indicated in the table below can be carried in a control subfield and this subfield can be called as delay status report (DSR) control subfield.

TABLE 3

Information contained in the independent urgent traffic indication frame transmitted by the STA to the AP

| Sub-field name | Size (bits) | Description |
| --- | --- | --- |
| Element ID | 8 | The element ID |
| Length | 8 | Length of the frame |
| Element ID extension | 8 | The element ID extension |
| Link ID | 4 | The link ID for which the information is being indicated. In one embodiment, the AP/AP MLD can perform resource sharing/medium time allocation in TXOP sharing mode on link indicated by this link ID. |
| TID | 4 | The TID for which this information is being indicated. The AP can also understand the priority of the buffered traffic based on its TID. |
| Packet identifier | 8 | A packet identifier (e.g., sequence number). When the AP receives a packet whose packet identifier matches this value, the AP can consider that the STA has transmitted the corresponding traffic and does not have any urgency unless another measurement response frame is received from the STA |
| Duration | 64 | The duration until which the packet will be retained in the STA's queue/the duration until which the packet's delay tolerance is not exceeded. In one embodiment, this can be indicated in terms of a pre-negotiated or pre-known value (e.g., TBTT, TU). In another embodiment, the duration can be indicated in terms of the TSF timer value at the time at which the delay tolerance of the indicated TID packet will be exceeded. According to one embodiment, the delay tolerance can be the value that is indicated in a QoS characteristic element. In another embodiment, the TSF time indicated can be indicated in reference to the TSF time of the transmitting link. Alternatively, this can also be any of the metrics mentioned herein previously for indicating urgency of traffic transmission. |

In some embodiments, the duration sub-field (shown in Table 3) can contain information for the HOL packet and can be referred to as HOL packet delay feedback. Further, the same field can be used to indicate the HOL packet enqueue time with a flag used to indicate which value the field is carrying.

Further, according to this embodiment, the STA can transmit the above independent urgent traffic indication frame to the AP when necessary on any of the links that it has setup with the AP without any authorization from the AP. Upon receiving the above frame from the STA, the AP can share portion of its TXOP with the STA if it acquires a TXOP within the duration indicated by the STA.

In another embodiment, the traffic urgency indication can also be provided by the STA to the AP in a modified A-control sub-field containing information mentioned in Table 2.

FIG. 11 illustrates an example format 1100 of a control information sub-field of a buffer status report frame for traffic urgency indication according to embodiments of the present disclosure. The embodiment of the example format 1100 of a control information sub-field of a buffer status report frame for traffic urgency indication shown in FIG. 11 is for illustration only. Other embodiments of the example format 1100 of a control information sub-field of a buffer status report frame for traffic urgency indication could be used without departing from the scope of this disclosure.

In another embodiment, the traffic urgency indication can also be provided in a modified buffer status report frame.

The control information sub-field of such a buffer status report frame can contain additional information compared to the buffer status report frame in the standard. The information added to the control information sub-field of the buffer status report can be as shown in Table 3 or can include one or more of the information fields indicated in Table 3. An example format of control information sub-field of such a modified buffer status report can be as shown in FIG. 11. One or more of these information fields can be present/absent. Further, one or more of these information fields can be sent in any other type of frame exchanged between the AP and the STA.

The STA can transmit this modified buffer status report to the AP when triggered by the AP or on its own. When the AP receives such a modified buffer status report from its associated STA, the AP can then follow a procedure similar to that shown in FIG. 9 described herein.

Further, the traffic urgency indication can be transmitted by the STA or an STA affiliated with a non-AP MLD to the AP or AP affiliated with an AP MLD in an independent frame or as a part of any of the existing frames in the standard.

Further, in another embodiment, the STA of an STA affiliated with a non-AP MLD can transmit one or more of the information fields indicated in Table 3 to the AP or an AP affiliated with an AP MLD for the purpose of resource request/medium time allocation for TXOP sharing for transmitting frames to its peer in P2P mode of operation. The TID information can indicate to the AP/AP MLD the priority of the packet(s) that are enqueued at the STA.

Upon receiving the frame, the AP/AP MLD can allocate medium time from its acquired TXOP duration to the STA for transmitting frames to its P2P peer STA. Further, according to this embodiment, the AP can also understand from the information provided by the STA which link to allocate the medium time on. The AP can understand the link in two ways.

According to one embodiment, any of the STAs affiliated with the non-AP MLD can transmit the frame with a link ID field in it and provide an explicit notification to the AP MLD/AP. The AP MLD/AP can then allocate medium time from its acquired TXOP duration on the link whose link ID is mentioned in the frame transmitted by an STA affiliated with the non-AP MLD. Note that in this case, the frame can be transmitted on any of the links that the non-AP MLD has setup with the AP MLD.

According to another embodiment, the non-AP MLD transmits the frame on the same link on which it wants the medium time to be allocated as a part of the acquired TXOP duration. Based on this implicit notification, the AP MLD can then allocate medium time on the same link on which the frame is received. Note that in this case, an explicit link ID indication may not be necessary. This implicit notification can be useful in the case of P2P wherein the frame can be transmitted on the same link that is being used for P2P operation.

According to one embodiment, the AP can infer that an STA is facing traffic urgency based on historical data. According to this information, for one or more frames transmitted by the STA to the AP, the STA can provide timing information to the AP (e.g., such as that described herein). Further, according to this embodiment, the STA can provide this information to the AP as a part of the frame transmitted to the AP or in a separate frame (e.g., measurement request and response framework or any of the existing frames in the spec). The AP can use this information to compute the delay that the STA faces when trying to transmit the frame. The AP can also compute this delay on a per TID/AC basis. According to this statistic, the AP can infer that the STA can face delay for its future transmissions and the AP can take necessary action to reduce delays for future transmissions (e.g., prioritize an STA with longer delays for triggered uplink). After taking the action, AP can again compute delays based on the information provided by the STA to assess if the STA's situation has improved or not. An example of this procedure is as follows. Suppose that AP1 is receiving packets from STA1. In each packet that STA1 transmits, STA1 provides timing information (e.g., enqueue timestamp or any of the metrics described herein). The AP uses the enqueue timestamp and the receive timestamp to compute the net delay that STA1 faces. To reduce this delay or to ensure that future packets do not face such a long delay, the AP can prioritize STA1 for triggered uplink transmission. The AP can infer presence of backlog at the STA either based on any of the procedures described in the present disclosure or based on any of the procedures existing in the spec (e.g., buffer status reporting).

In another embodiment, AP/AP MLD can give higher preference to EPCS (Emergency Preparedness Communications Service) enabled devices over non-EPCS devices in scheduling decisions. Further according to this embodiment, when making any kind of scheduling decisions in TXOP sharing mode, the AP/AP MLD can give higher preference to buffered traffic/frames of STAs that are affiliated with non-AP MLDs that have EPCS authorization enabled. For instance, if the AP/AP MLD has the option of allocating medium time/resources in TXOP sharing mode to two STAs—STA1 and STA2 and STA1 is affiliated with a non-AP MLD that is EPCS authorized/enabled and STA2 is affiliated with a non-AP MLD that is not EPCS authorized/enabled, then the AP/AP MLD can give higher priority to STA1 over STA2 when allocating medium time/resources in TXOP sharing mode. Further, this higher preference for EPCS authorized devices can be given by the AP/AP MLD for downlink and/or uplink traffic scheduling as a part of other scheduling related features in the standard (e.g., triggered based transmissions) and is not limited to TXOP sharing mode alone.

Any of the above frames can be transmitted by an STA or an STA affiliated with a non-AP MLD to the AP or an AP affiliated with an AP MLD. If the frame is transmitted by an STA affiliated with a non-AP MLD to an AP affiliated with an AP MLD, then the frame can be transmitted on any of the links that are setup between the non-AP MLD and the AP MLD.

In one embodiment, upon receiving any of the above frames, the AP can allocate a portion of its TXOP either on the link that the STA has indicated via Link ID. In another embodiment, the AP can select the link on which to allocate a portion of the TXOP based on its own knowledge of TID to link mapping.

In one embodiment, the STA can also transmit the above frames on any of the links that have been setup between itself and the AP that it is associated with.

Further, the information fields discussed in this disclosure can be transmitted as a part of any of the existing frames in the standard. One or more of the information fields can be pre sent/ab sent.

The embodiments presented in this disclosure are not limited to TXOP sharing and can be used for any other purposes (e.g., scheduling uplink RUs by the AP).

For example, the embodiments described herein can be applied for restricted TWT (R-TWT) purposes. According to one embodiment, based on traffic urgency indication, the AP can prioritize STAs with higher urgency packets (e.g., earlier packet expiration times) for transmission.

Further, according to this embodiment, the STA can provide traffic urgency indication to the AP after the packets are queued at the STA side. The STA can use any of the procedures indicated above for traffic urgency. When scheduling STAs for uplink transmission in R-TWT service periods, the AP can schedule those STAs whose traffic has higher urgency. As an example, if three STAs provide traffic urgency indication to the AP—STA1 with packet expiration in 10 ms, STA2 with packet expiration in 1 ms, STA3 with packet expiration in 40 ms. The AP can schedule STA2 then schedule STA1 and then STA4 for transmission.

According to another embodiment, when making any scheduling decision (e.g., for triggered uplink transmission), the AP can give higher priority to STAs with higher urgency packets. Similar to the example provided above, if three STAs provide the traffic urgency indication, the AP can trigger STA2 first for uplink transmission followed by STA1 and then STA4.

Figure 12:
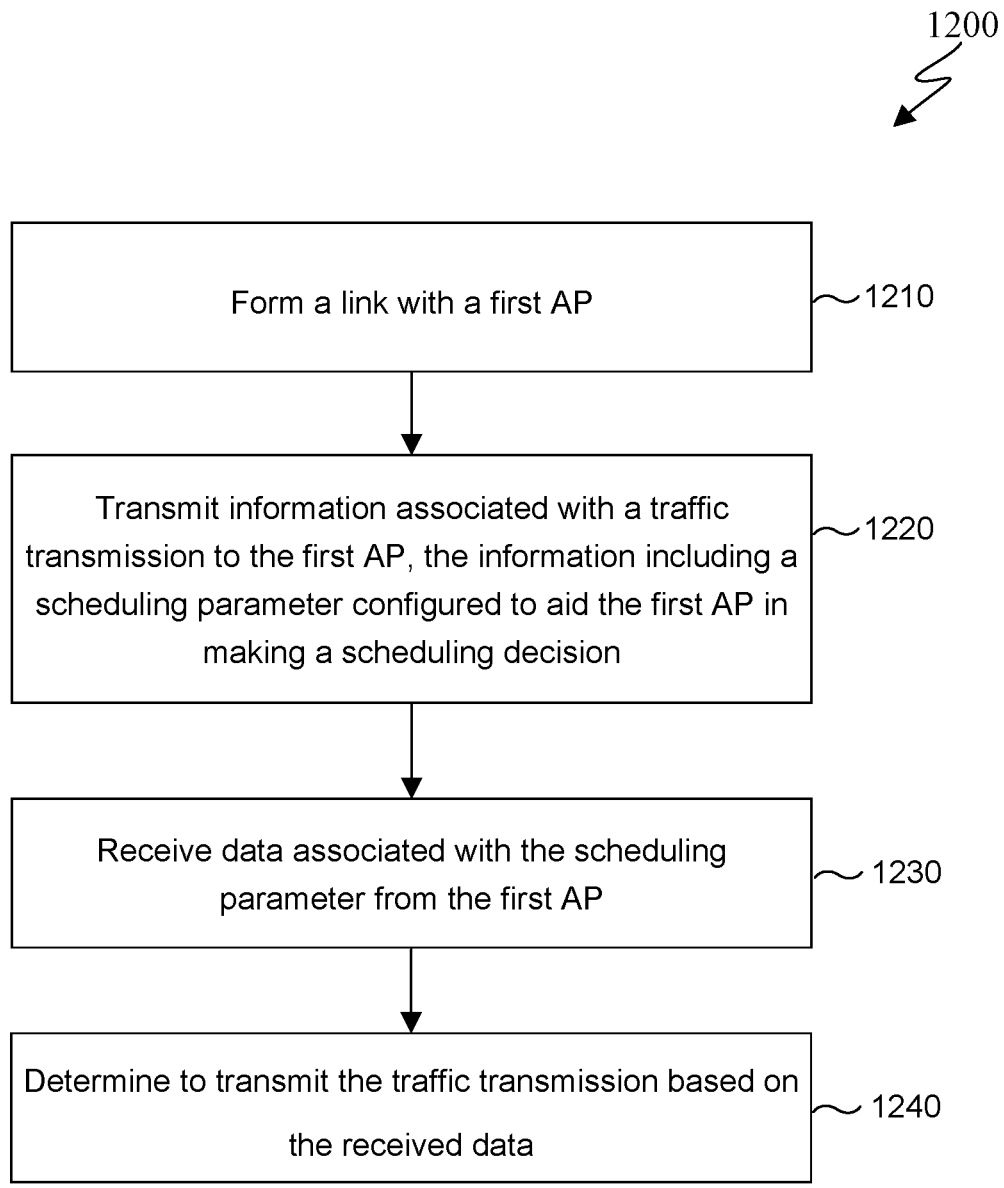
FIG. 12 illustrates a flowchart of a method for wireless communication performed by a non-AP device according to embodiments of the present disclosure.

FIG. 12 illustrates a flowchart of a method 1200 for wireless communication performed by a non-AP device that comprises a first STA according to embodiments of the present disclosure. The embodiment of the method 1200 for wireless communication performed by a non-AP device that comprises a first STA shown in FIG. 12 is for illustration only. Other embodiments of the method 1200 for wireless communication performed by a non-AP device that comprises a first STA could be used without departing from the scope of this disclosure.

As illustrated in FIG. 12, the method 1200 begins at step 1210, where the non-AP device forms a link with a first AP. In step 1220, the non-AP device transmits information associated with a traffic transmission to the first AP, the information including a scheduling parameter configured to aid the first AP in making a scheduling decision. In step 1230, the non-AP device receives data associated with the scheduling parameter from the first AP. In step 1240, based on the received data, the non-AP device determines to transmit the traffic transmission to the first AP.

In one embodiment, the scheduling parameter includes a timing parameter associated with timing information.

In one embodiment, the timing parameter comprises: a duration for which a packet of the traffic transmission will be kept in a STA queue or a time until a delay bound of the packet of the traffic transmission is not exceeded; or a packet enqueue time associated with a time at which a packet of the traffic transmission was enqueued at the STA.

In one embodiment, the non-AP device determines whether the scheduling parameter is associated with an existing measurement request and response framework; and transmits the scheduling parameter based on the scheduling parameter being associated with the existing measurement request and response framework.

In one embodiment, the non-AP device determines whether the scheduling parameter is associated with an independent frame; and transmits the scheduling parameter based on the scheduling parameter being associated with the independent frame.

In one embodiment, the non-AP device determines whether the scheduling parameter is associated with a sub-field in the independent frame; and transmits the scheduling parameter based on the scheduling parameter being associated with the sub-field in the independent frame.

In one embodiment, the non-AP device determines whether the scheduling parameter is associated with a buffer status report; and transmits the scheduling parameter based on the scheduling parameter being associated with the buffer status report.

In one embodiment, the non-AP device determines whether the scheduling parameter is associated with a control subfield variant of an A-Control subfield; and transmits the scheduling parameter based on the scheduling parameter being associated with the control subfield variant of an A-Control subfield.

In one embodiment, the non-AP device is a non-AP multi-link device (MLD), the first STA is one of a plurality of STAs in the non-AP MLD, and the AP is one of a plurality of APs in an AP MLD, wherein the non-AP device forms a link with a corresponding AP of an AP MLD, transmits information associated with a traffic transmission to the corresponding AP, the information including a scheduling parameter configured to aid the corresponding AP in making a scheduling decision, receives data associated with the scheduling parameter from the AP MLD, and based on the received data, determines to transmit the traffic transmission to the AP MLD over a link between the non-AP MLD and the AP MLD.

In one embodiment, the information comprises an explicit link identification indication for indicating to which link between the non-AP MLD and the AP MLD the information corresponds.

The above flowcharts illustrate example methods that can be implemented in accordance with the principles of the present disclosure and various changes could be made to the methods or processes illustrated in the flowcharts. For example, while shown as a series of steps, various steps could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A non-access point (AP) device comprising:
a first station (STA) comprising:
a transceiver configured to:
form a link with a first AP,
transmit information associated with a traffic transmission to the first AP, the information including a scheduling parameter configured to aid the first AP in making a scheduling decision, and
receive data associated with the scheduling parameter from the first AP; and
a processor operably coupled to the first STA, the processor configured, based on the received data, to determine to transmit the traffic transmission to the first AP.

2. The non-AP device of claim 1, wherein the scheduling parameter includes a timing parameter associated with timing information.

3. The non-AP device of claim 2, wherein the timing parameter comprises:

a duration for which a packet of the traffic transmission will be kept in a STA queue or a time until a delay bound of the packet of the traffic transmission is not exceeded; or a packet enqueue time associated with a time at which a packet of the traffic transmission was enqueued at the STA.

4. The non-AP device of claim 1, wherein:

the processor is configured to determine whether the scheduling parameter is associated with an existing measurement request and response framework, and the transceiver is configured to transmit the scheduling parameter based on the scheduling parameter being associated with the existing measurement request and response framework.

5. The non-AP device of claim 1, wherein:

the processor is configured to determine whether the scheduling parameter is associated with an independent frame, and the transceiver is configured to transmit the scheduling parameter based on the scheduling parameter being associated with the independent frame.

6. The non-AP device of claim 5, wherein:

the processor is configured to determine whether the scheduling parameter is associated with a sub-field in the independent frame, and the transceiver is configured to transmit the scheduling parameter based on the scheduling parameter being associated the sub-field in the independent frame.

7. The non-AP device of claim 1, wherein:

the processor is configured to determine whether the scheduling parameter is associated with a buffer status report, and the transceiver is configured to transmit the scheduling parameter based on the scheduling parameter being associated with the buffer status report.

8. The non-AP device of claim 1, wherein:

the processor is configured to determine whether the scheduling parameter is associated with a control subfield variant of an A-Control subfield, and the transceiver is configured to transmit the scheduling parameter based on the scheduling parameter being associated with the control subfield variant of an A-Control subfield.

9. The non-AP device of claim 1, wherein:

the non-AP device is a non-AP multi-link device (MLD), the first STA is one of a plurality of STAs in the non-AP MLD, the AP is one of a plurality of APs in an AP MLD, each of the plurality of STAs comprises a transceiver configured to:

form a link with a corresponding AP of an AP MLD, transmit information associated with a traffic transmission to the corresponding AP, the information including a scheduling parameter configured to aid the corresponding AP in making a scheduling decision, and receive data associated with the scheduling parameter from the AP MLD; and a processor operably coupled to the plurality of STAs, the processor configured, based on the received data, to determine to transmit the traffic transmission to the AP MLD over a link between the non-AP MLD and the AP MLD.

10. The non-AP device of claim 9, wherein the information comprises an explicit link identification indication for indicating to which link between the non-AP MLD and the AP MLD the information corresponds.

11. A method of wireless communication performed by a non-access point (AP) device that comprises a first station (STA), the method comprising:

forming a link with a first AP;

transmitting information associated with a traffic transmission to the first AP, the information including a scheduling parameter configured to aid the first AP in making a scheduling decision;

receiving data associated with the scheduling parameter from the first AP; and based on the received data, determining to transmit the traffic transmission to the first AP.

12. The method of claim 11, wherein the scheduling parameter includes a timing parameter associated with timing information.

13. The method of claim 12, wherein the timing parameter comprises:

a duration for which a packet of the traffic transmission will be kept in a STA queue or a time until a delay bound of the packet of the traffic transmission is not exceeded; or a packet enqueue time associated with a time at which a packet of the traffic transmission was enqueued at the STA.

14. The method of claim 12, further comprising:

determining whether the scheduling parameter is associated with an existing measurement request and response framework; and transmitting the scheduling parameter based on the scheduling parameter being associated with the existing measurement request and response framework.

15. The method of claim 11, further comprising:

determining whether the scheduling parameter is associated with an independent frame; and transmitting the scheduling parameter based on the scheduling parameter being associated with the independent frame.

16. The method of claim 15, further comprising:

determining whether the scheduling parameter is associated with a sub-field in the independent frame; and transmitting the scheduling parameter based on the scheduling parameter being associated with the sub-field in the independent frame.

17. The method of claim 11, further comprising:

determining whether the scheduling parameter is associated with a buffer status report; and transmitting the scheduling parameter based on the scheduling parameter being associated with the buffer status report.

18. The method of claim 11, further comprising:

determining whether the scheduling parameter is associated with a control subfield variant of an A-Control subfield; and transmitting the scheduling parameter based on the scheduling parameter being associated with the control subfield variant of an A-Control subfield.

19. The method of claim 11, wherein:

the non-AP device is a non-AP multi-link device (MLD), the first STA is one of a plurality of STAs in the non-AP MLD, the AP is one of a plurality of APs in an AP MLD, the method further comprising:

forming a link with a corresponding AP of an AP MLD, transmitting information associated with a traffic transmission to the corresponding AP, the information including a scheduling parameter configured to aid the corresponding AP in making a scheduling decision, receiving data associated with the scheduling parameter from the AP MLD, and based on the received data, determining to transmit the traffic transmission to the AP MLD over a link between the non-AP MLD and the AP MLD.

20. The method of claim 19, wherein the information comprises an explicit link identification indication for indicating to which link between the non-AP MLD and the AP MLD the information corresponds.

\* \* \* \* \*